350-96.31
SR
7/19/83 XR 4,394,083

United States Patent [19]

Rees

[11] 4,394,083

[45] Jul. 19, 1983

[54] IMAGING SYSTEM FOR A MULTI-MAGNIFICATION COPIER UTILIZING GRADIENT INDEX LENS ARRAY

[75] Inventor: James D. Rees, Pittsford, N.Y.

[73] Assignee: Xerox Corporation, Stamford, Conn.

[21] Appl. No.: 341,409

[22] Filed: Jan. 21, 1982

[51] Int. Cl.[3] .......................... G03B 27/00; G03B 27/68

[52] U.S. Cl. .......................... 355/1; 350/96.31; 350/413; 355/50; 355/52

[58] Field of Search .......................... 355/1, 8, 11, 46, 50, 355/52; 350/96.31, 413, 96.25, 417, 96.12, 96.1, 96.28

[56] References Cited

U.S. PATENT DOCUMENTS

| | | | |
|---|---|---|---|
| 3,126,809 | 3/1964 | Adams et al. | 95/75 |
| 3,625,686 | 12/1971 | Kitano | 355/1 X |
| 3,658,407 | 4/1972 | Kitano et al. | 350/96 B |
| 3,861,797 | 1/1975 | Nishida et al. | 355/52 |
| 3,922,062 | 11/1975 | Uchida | 350/96.12 |
| 3,947,106 | 3/1976 | Hamaguchi et al. | 355/1 |
| 3,977,777 | 8/1976 | Tanaka et al. | 355/1 |
| 4,111,551 | 9/1978 | Klann | 355/84 |
| 4,168,900 | 9/1979 | Adachi | 355/1 |
| 4,194,827 | 3/1980 | Bleeker et al. | 355/1 |
| 4,331,380 | 5/1982 | Rees et al. | 350/96.25 |
| 4,349,248 | 9/1982 | Rees | 350/413 |

FOREIGN PATENT DOCUMENTS 40548 5/1981 European Pat. Off. .

OTHER PUBLICATIONS

"Gradient-Index Optics: A Review," Duncan T. Moore, Applied Optics, Apr. 1, 1980, vol. 19, No. 7, pp. 1035-1038.

*Primary Examiner*—Richard A. Wintercorn

[57] ABSTRACT

The invention relates to an imaging system for a multi-magnification copier which employs a plurality of gradient index lens arrays to provide a 1× as well as a magnification capability. The magnification range of the copier is extended beyond the discrete value associated with each lens array by changing the speed at which the document is normally scanned in the isometric mode so that the image is anamorphically magnified in the scanning direction. This magnification either enlarges or compresses the image at the imaging plane and, due to the narrow scan slit employed with gradient index lens arrays, retains adequate resolution in the developed image.

3 Claims, 3 Drawing Figures

IMAGING SYSTEM FOR A MULTI-MAGNIFICATION COPIER UTILIZING GRADIENT INDEX LENS ARRAY

BACKGROUND AND PRIOR ART STATEMENT

The present invention relates to an imaging system which utilizes a plurality of gradient index lens arrays to transmit an image of a document at an object plane to an image plane at various magnifications. More particularly, the invention relates to an optical system which extends the magnification range of a given system by anamorphically enlarging or reducing the image transmitted at the image plane at a particular magnification.

Image transmitters comprising bundled gradient index optical fibers are known in the art. U.S. Pat. No. 3,658,407 describes a light conducting fiber made of glass or synthetic resin which has a refractive index distribution in a cross section thereof that varies parabolically outward from a center portion thereof. Each fiber acts as a focusing lens to transmit part of an image of an object placed near one end. An assembly of fibers, in a staggered two-row array, transmit and focus an image of the object. The fiber lenses are produced under the trade name "SELFOC"; the mark is registered in Japan and owned by Nippon Sheet Glass Co., Ltd..

Numerous techniques are known in the art for manufacturing glass or plastic fibers with index-of-refraction variations. These are usefully summarized in an article entitled "Gradient Index Optics: a review" by Duncan T. Moore, Applied Optics, Apr. 1, 1980, Volume 19, No. 7, pp. 1035–1038.

Gradient index lens arrays have found wide acceptance as a replacement for conventional image transmitting components in copiers as disclosed, for example, in U.S. Pat. Nos. 3,947,106 and 3,977,777.

Also known in the art are other types of fiber optics image transmitters where the fiber optics essentially act as light pipes. Such a system is disclosed in U.S. Pat. No. 4,194,827 (Bleeker et al.). In this type of imaging system, the ends of the image transmitter are in vertical contact with the document and imaging plane and light is transmitted by multiple internal reflection along the fiber lengths. In Col. 3 of the '827 patent is a suggestion that a single image transmitter could be utilized to produce an enlarged or reduced image by providing a differential rate of movement of the original and receptor surface.

Each of the prior art references related to gradient index lenses discloses a single gradient index lens array transmitting images at a magnification of 1:1. A gradient index lens array that transmits images at other than unity magnification has been disclosed in copending U.S. Application Ser. No. 151,994, published as EPO Publication 0040548, assigned to the same assignee as the present invention. In this application were disclosed various reproduction systems which could utilize the nozel gradient index lens array disclosed therein. One embodiment discloses a plurality of gradient index lens arrays, constructed according to the invention, each lens array capable of transmitting to an image plane at a specific magnification. While this type of system is satisfactory for systems requiring only one or two discrete magnification changes, it would be desirable to extend this magnification range without the attendant expense of introducing additional lens arrays.

The present invention is therefore directed to an imaging system for a multi-magnification copier wherein a document on an object plane is reproduced on a photosensitive image plane at a selected magnification, the imaging system including a gradient index lens array assembly comprising: a first gradient index lens array positioned between the object and image plane, to transmit an image of said document onto said image plane at a first magnification; at least a second gradient index lens array positioned between the object and image planes, said lens array adapted to transmit an image of said document onto said image plane at a second magnification; means for illuminating a narrow longitudinal strip of said document; means for providing relative movement between document, lens array assembly and image plane, so as to scan the document at the selected magnification; means for preventing transmission of said document image through a selected one of said lens arrays whereby light reflected from said document is transmitted through said other array at the particular magnification onto the image plane; and means for varying said relative movement, at a selected magnification, so as to anamorphically enlarge or reduce the exposed image at said image plane.

DRAWINGS

DESCRIPTION

In aforementioned U.S. Application Ser. No. 151,994 (published as EPO Publication 0040548 on Nov. 25, 1981) and whose contents are hereby incorporated by reference, a gradient index lens array was disclosed which was capable of transmitting an image of a document at an object plane onto an image plane at a magnification other than unity. Briefly, this result was obtained by assembly and design of the gradient index fibers which comprised the array. Each fiber, or, more precisely, each fiber axis, was oriented in a prescribed fashion with relation to adjoining fibers. Each fiber length was adjusted to maintain the required conjugate distance. When the fibers are assembled at the length appropriate for the linear distance along which imaging takes place, the resulting array assumed a characteristic fanfold shape.

Figure 1:
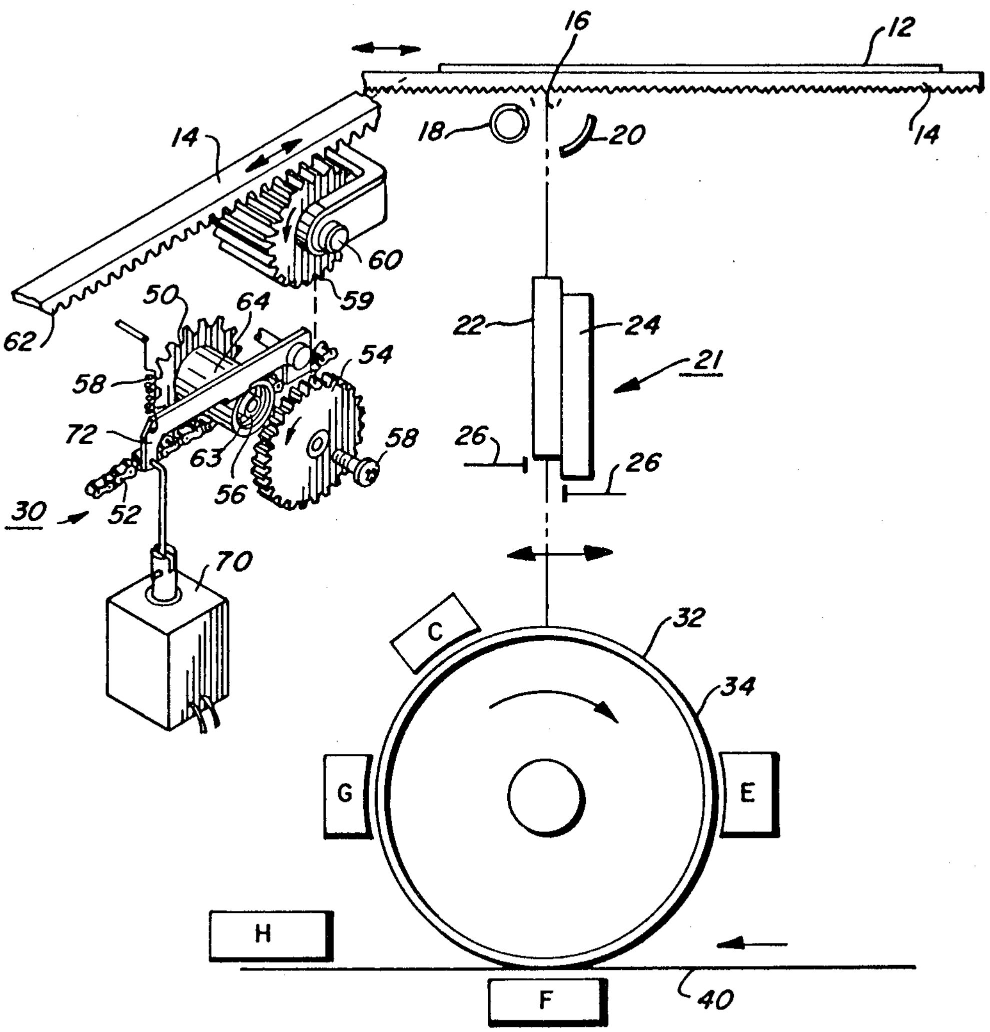
FIG. 1 is a schematic showing a gradient index lens array assembly in a xerographic copying system.

FIG. 1 illustrates a first embodiment of the invention wherein a conventional 1× gradient index lens array is used in conjunction with a reduction/enlargement lens array designed for magnification of 0.707X.

As shown in FIG. 1, document 12 is placed on platen 14. The platen is adapted to move past a narrow illumination strip 16 which is brightly illuminated by apertured lamp 18 acting in combination with reflector 20. The imaging system comprises a lens assembly 21 comprising of gradient index lens array 22 which transmits an image of the document onto an imaging plane (photoreceptor surface 32 of drum 34) at unity magnification and gradient index reduction lens array 24 connected to array 22 designed to transmit a document image onto surface 32 at a 0.707 magnification. Shutter 26 is adapted to move in the direction indicated or, alternately may remain stationary and, (by means not shown), the appropriate lens array moved into transmitting position.

In operation, platen 14 is moved through the illuminated area by rack gear assembly 30 whose operation is explained in greater detail below. Light impinging on a narrow longitudinal strip of the document is reflected towards the lens assembly 21. Since the shutter 26 is covering lens array 24, lens array 22 transmits the reflected image, at unity magnification, onto the photosensitive surface 32 of drum 34 rotating at the same velocity as the platen motion. Surface 32, previously receiving an electrostatic charge at station C, is thus exposed in image-wise fashion. The latent image is developed at development station E by application of toner material of appropriate polarity. The developed image is brought into contact with support sheet 40 within a transfer station F and the toner image is electrostatically attracted from the surface 32 to the contacting side of the support sheet. Any residual toner particles remaining on the surface 32 after the completion of the transfer operation are removed within a cleaning station G, placing the surface in a condition to repeat the process. After the transfer operation, the image bearing support sheet is forwarded to a fusing station H via a suitable conveyor. These various xerographic process stages are well known in the art.

The movement of the platen is controlled by the rack gear assembly 30 shown in FIG. 1. Assembly 30, together with a portion of platen 14 is shown offset for descriptive purposes but it is understood that the normal position of the assembly 30 components is directly beneath the platen.

Assembly 30 consists of a sprocket wheel 50 driven via chain 52. Chain 52 is driven via a dc motor drive arrangement (not shown). A feed gear 54, shown in the disengaged condition, is attached to a boss 56 by screw 58. The feed gear is associated with a rack gear 59, rotatably secured by shaft 60 so as to drive platen 14 via rack 62 in the indicated directions.

A spring clutch mechanism is provided for transmitting the revolution of the sprocket wheel 50 to feed gear 54. The clutch mechanism comprises a spring 63 installed within a sleeve 64, both hooked ends of the spring 63 being fixed to sprocket wheel 50 and sleeve 64. In the normal condition, the feed gear 54 is maintained in the stopped position even though the spring 63 and sleeve 64 rotate in unison with sprocket wheel 50.

When feedforward solenoid 70 is activated by microswitches (not shown), clutch lever 72 is pulled downward to depress sleeve 64 whereby spring 63 clings to base 56 of feed gear 54. The resolution of wheel 50 is then transmitted to feed gear 54 driving platen 14 through the rack gear 59 arrangement. A reverse clutch mechanism for driving the platen back to its start position has been omitted from the drawing for purposes of clarity.

From the above arrangement, it is apparent that the rate at which platen 14 is moved can be varied by changing the rate of travel of chain 52. This change can be achieved for example, by driving chain 52 at varying rates by means of a dc motor (not shown).

The system described thus far is capable of transmitting images at only two discrete magnifications, i.e. 1× or 0.707× with the 0.707× reduction being accomplished by the conventional isometric technique (i.e. both dimensions of the copied information are reduced proportionately). The 0.707×reduction chosen is a important value since it can accommodate the most common reductions required for business documents; i.e. on A3 document (11.69×16.54) is reduced to fit exactly onto an A4 output paper (8.27×11.69); a legal size document (14×11) is reduced to fit onto a letter-size output paper; an A3 document is reduced to a B4 output paper and computer printout is reduced to a letter-size output. The latter three reductions result in varying degrees of white border but without loss of document information.

One important exception to the above described capability is the reduction of an 11″×17″ document to letter-size (8-½×11). In this case, some portions of the 17″ dimensions would be lost to the paper output. According to one aspect of the present invention, this additional reduction capability is achieved in the system of FIG. 1 without the addition of a third lens array specifically designed for a 0.647 reduction. This additional capability is achieved by utilizing the 0.707× lens array and providing for a variation of the rate at which the platen, and hence the document, moves through the exposure zone.

Figure 2A:
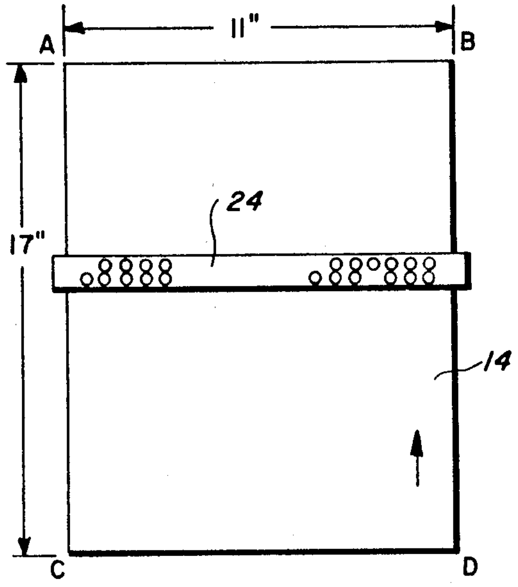
FIG. 2 shows a portion of a variable control system for changing the speed of the platen shown as FIG. 1.
Figure 2B:
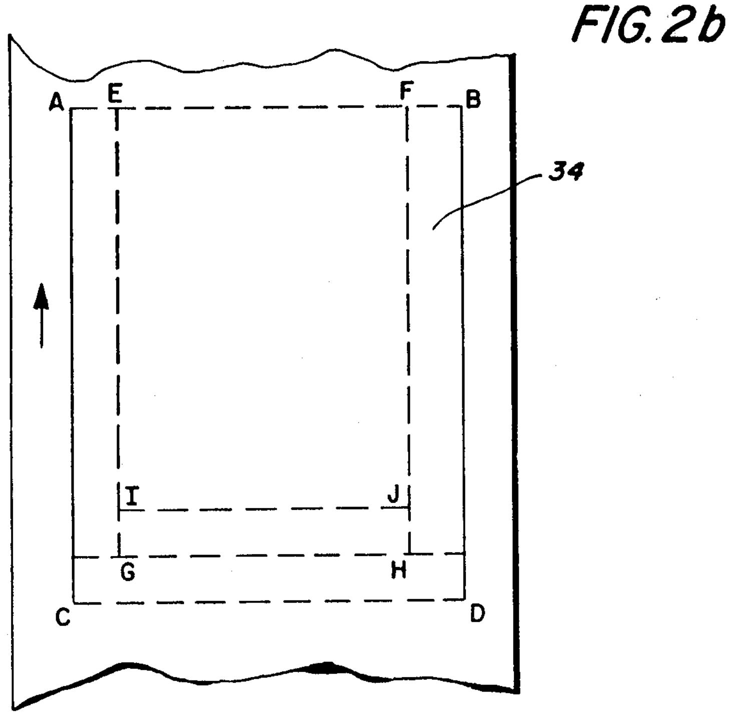

To more fully appreciate the above operation, reference is made to FIG. 2. FIG. **2*a* is a top view of FIG. 2, simplified to show only an 11″×17″ document 14 moving past the 0.707× reduction lens array 24 in a short edge feed mode. FIG. 2*b* shows drum surface 34 in a flat condition to demonstrate the changes in document size at the various reductions and speed relationships. Assuming that the document and the photoreceptor are moving at an initial 1× velocity of 7 in/sec. the following table, keyed into FIG. 2**, lists the various size changes.

TABLE

| Magnification | Document Image Size | Document Velocity* | Photoreceptor Velocity |
|---|---|---|---|
| 1× | 17 × 11 (ABCD) | 7 in/sec. | 7 in/sec. |
| .707× | 12.02 × 7.78 (EFGH) | 9.9 in/sec. | 7 in/sec. |
| .647× (in scan direction only) | 11 × 7.78 (EFIJ) | 10.8 in/sec. | 7 in/sec. |

*changes in velocity made by changing platen drive input

From the table, it is seen that, at the normal 0.707× reduction, a 1.02 strip of information will not be copied at all onto an 8-½″×11″ copy sheet. But by increasing the scanning by 0.9 in/sec. (an 8.5% increase), the 17″ dimension is exposed onto the same surface area of the photoreceptor as a 0.647× lens array would have provided. Thus, the developed area is then of a proper size to be transferred to the 8-½″×11″ copy sheet. Stated alternatively, an anamorphic magnification value designated as k is superimposed upon the isometric magnification, i.e. final magnification (reduction) in scan direction=m.k=0.707×0.925=0.65. The compression of the 12.02 information is in only the scanning (17″)dimension; the reduced 7.78″ dimension remains unchanged. Because the anamorphically reduced change is so small (8.5%) and because of the very narrow effective illumination slit widths required for transmission through gradient index lens arrays (approximately 1.5 mm–3 mm range), adequate resolution of the image at the photoreceptor surface results. And, assuming that up to 10% anamorphism would still result in satisfactory resolution at the image plane, it is evident that, when the 0.707× lens array is in place, a "continuous" magnification range of 0.777× to 0.657× is possible.

Various other lens array and platen speed changes are possible consistent with the principles of the invention. For example, in FIG. 1, the 1× lens can be placed into the transmission position and a magnification range of 1.1× to 0.9× can be enabled by appropriate platen velocity changes. The range can also be extended by introduction of additional lens arrays, each providing a discrete magnification.

While a particular arrangement has been shown to provide a variable rate of travel to the platen, other mechanisms known to the art may be employed. And, since the principle of anamorphism relies upon the relative rates of travel between the scanned document and the imaging plane, other systems which provide the necessary relative movement are possible; e.g. a stationary document, a moving lens array and a moving photoreceptor system.

I claim:

1. An imaging system for a multi-magnification copier wherein a document on an object plane is reproduced onto a photosensitive image plane at a selected magnification, said system including:

a lens array assembly comprising a first gradient index lens array positioned between the object and image planes, to transmit an image of said document onto said image plane first at a unity magnification, a second gradient index lens array positioned between the object and image planes, said lens array adapted to transmit an image of said document onto said image plane at a second magnification m other than unity, said system further including:

means for preventing transmission of said document image through a selected one of said lens arrays whereby light reflected from said document is transmitted through said other array in the particular magnification onto the image plane, illumination means placed beneath the object plane and adapted to provide a narrow illumination band of light along the bottom surface of the object plane so as to create a document scan exposure zone, means for driving said document past said exposure zone, said driving means adapted to move the platen at a first rate associated with said unity magnification, a second rate associated with said second magnification and at least a third rate at one of said magnifications, said third rate resulting in an anamorphic magnification K of said document image at said imaging plane in the scan direction, and means for moving the image plane at a process speed V.

2. The imaging system of claim 1, said document driving means driving said document at a first rate equal to said process speed V when said first lens array is in the transmitting position; at a second rate M/V when said second lens array is in the transmitting position and at a third rate MK/V.

3. The imaging system of claim 2 wherein said first lens array provides a 1× magnification, said second lens array provides a 0.707× magnification, and said anamorphic magnification lies in a range from 0.9 to 1.1.

* * * * *